US010617490B2

(12) United States Patent
Regev et al.

(10) Patent No.: US 10,617,490 B2
(45) Date of Patent: Apr. 14, 2020

(54) SPRING BASED ORTHODONTIC DEVICE AND METHODS OF USING THEREOF

(71) Applicants: David Regev, Kfar Sava (IL); Daniel Harel, Kampen (NL); Ehud Ayalon, Modiin-Maccabim-Reut (IL)

(72) Inventors: David Regev, Kfar Sava (IL); Daniel Harel, Kampen (NL); Ehud Ayalon, Modiin-Maccabim-Reut (IL)

(73) Assignees: Daniel Harel, Kampen (NL); David Regev, Kfar Sava (IL); Ehud Ayalon, Modiin-Maccabin-Reut (IL)

( * ) Notice: Subject to any disclaimer, the term of this patent is extended or adjusted under 35 U.S.C. 154(b) by 0 days.

(21) Appl. No.: 15/287,012

(22) Filed: Oct. 6, 2016

(65) Prior Publication Data
US 2017/0112595 A1   Apr. 27, 2017

Related U.S. Application Data

(63) Continuation of application No. PCT/US2015/027015, filed on Apr. 22, 2015.
(Continued)

(51) Int. Cl.
*A61C 7/22* (2006.01)
*A61C 7/30* (2006.01)
(Continued)

(52) U.S. Cl.
CPC ............ *A61C 7/22* (2013.01); *A61C 7/002* (2013.01); *A61C 7/143* (2013.01); *A61C 7/145* (2013.01);
(Continued)

(58) Field of Classification Search
CPC .......... A61C 7/22; A61C 7/002; A61C 7/143; A61C 7/145; A61C 7/28; A61C 7/30; A61C 7/16
(Continued)

(56) References Cited

U.S. PATENT DOCUMENTS 3,593,421 A * 7/1971 Brader ............... A61C 7/20
433/21
3,815,237 A * 6/1974 Wallshein ............ A61C 7/12
433/21
(Continued)

FOREIGN PATENT DOCUMENTS

CN         103405276 B     11/2015

OTHER PUBLICATIONS

The International Search Report and the Written Opinion of the International Searching Authority for PCT/US2015/027015, ISA/RU, Moscow, Russia, dated Aug. 6, 2015.

*Primary Examiner* — Ralph A Lewis
(74) *Attorney, Agent, or Firm* — M&B IP Analysts, LLC

(57) ABSTRACT

An orthodontic device and methods thereof for correcting an arrangement of teeth are provided. The orthodontic device includes a plurality of brackets for attaching to teeth; a plurality of spring anchoring units, wherein each of the plurality of spring anchoring units is attached to one of the plurality of brackets; and a spring having a tension, two-dimensional longitudinal deformability and two-dimensional rotational deformability, wherein the spring is attached to each spring anchoring unit, wherein the tension is zero prior to attaching the plurality of brackets to the teeth, wherein further the tension is greater than zero immediately after attaching the plurality of brackets to the teeth, wherein further the tension is zero when the plurality of brackets is attached to the teeth and in an optimal position.

25 Claims, 11 Drawing Sheets

Related U.S. Application Data

(60) Provisional application No. 61/983,301, filed on Apr. 23, 2014.

(51) Int. Cl.
| | |
|---|---|
| *A61C 7/00* | (2006.01) |
| *A61C 7/14* | (2006.01) |
| *A61C 7/28* | (2006.01) |
| *B33Y 80/00* | (2015.01) |
| *B29C 65/02* | (2006.01) |
| *B29C 65/48* | (2006.01) |
| *A61C 7/16* | (2006.01) |
| *B29L 31/00* | (2006.01) |

(52) U.S. Cl.
CPC .................. *A61C 7/28* (2013.01); *A61C 7/30* (2013.01); *B29C 65/02* (2013.01); *B29C 65/48* (2013.01); *B33Y 80/00* (2014.12); *A61C 7/16* (2013.01); *B29L 2031/753* (2013.01)

(58) Field of Classification Search
USPC .......................................... 433/8–17, 21, 22
See application file for complete search history.

(56) References Cited

U.S. PATENT DOCUMENTS

| | | | |
|---|---|---|---|
| 3,988,832 A | * | 11/1976 | Wallshein ................ A61C 7/20 433/21 |
| 5,299,935 A | | 4/1994 | Lokar |
| 6,033,216 A | | 3/2000 | Souris |
| 2004/0219474 A1 | | 11/2004 | Cleary |
| 2004/0259049 A1 | | 12/2004 | Kopelman et al. |
| 2006/0014116 A1 | | 1/2006 | Maijer et al. |
| 2011/0143301 A1 | | 6/2011 | Maijer et al. |
| 2012/0315595 A1 | * | 12/2012 | Beaudoin ................ A61C 7/287 433/9 |
| 2013/0309625 A1 | | 11/2013 | Macchi et al. |
| 2014/0067334 A1 | | 3/2014 | Kuo |

* cited by examiner

US 10,617,490 B2

SPRING BASED ORTHODONTIC DEVICE AND METHODS OF USING THEREOF

CROSS-REFERENCE TO RELATED APPLICATIONS

This application is a continuation of PCT application No. PCT/US2015/027015, filed on Apr. 22, 2015 which claims the benefit of U.S. Provisional Application No. 61/983,301 filed on Apr. 23, 2014, the contents of which are hereby incorporated by reference.

TECHNICAL FIELD

The present disclosure relates generally to orthodontic devices used to alter the arrangement of teeth in the mouth, and more specifically to orthodontic devices using springs to alter teeth arrangement.

BACKGROUND

Orthodontics are directed towards the treatment of malocclusions that result from irregular tooth positioning within a mouth. Most orthodontic methods include the use of brackets or "braces" attached to predetermined teeth, with the orthodontic system adapted to slowly drive the teeth into final optimal positions as determined prior to placement of brackets on the teeth. In the US, the orthodontics market is in excess of $12 billion, growing at 1.5% annually. Large percentages of teenagers are being treated for tooth irregularities to help improve physical appearance, speaking, and eating.

As the market for orthodontic products is so large, numerous improvements have been made in the treatment of misplaced teeth. Ceramic brackets, lingual treatments, and "invisible" plastic elements have all been employed pursuant to making orthodontic treatments both more effective and less invasive. Many patients being treated with brackets or their alternatives prefer to have little to no visible signs of the expensive "hardware" in their mouths.

One of the challenges facing any orthodontic procedure concerns the overall success of the treatment. The vast majority of orthodontic procedures are based on archwire systems, wherein the archwire is prepared from a "shape-memory" material. The archwire is prepared and shaped according to details of the specific teeth and treatment in question. During the course of the treatment, the archwire, in attempting to return to a predetermined shape, pulls, pushes, or otherwise directs teeth towards predetermined positions as desired at the end of treatment.

Orthodontia has been around for decades, and for many children, wearing "braces" has become a rite of passage. FIG. 1 shows a schematic view of an orthodontic device that includes a traditional archwire 190 and brackets 170 applied to teeth 120 for the purpose of straightening out the teeth 120. The archwire 190 is often made of a shape-memory alloy which drives the teeth 120 towards predetermined final positions as desired by dentist and patient.

Some existing solutions utilize an orthodontic device featuring brackets and an archwire placed on a lingual side of teeth. The major advantage of such existing solutions is the invisibility to outside observers.

Other existing solutions utilize a plastic orthodontic device that is adapted to minimize external visibility. A plastic mouthpiece designed to fit around and adjust teeth position is placed over teeth, but is nearly invisible to an outside observer.

It should be noted that the archwires occasionally need to be replaced during treatment, and that the plastic mouthpiece must be periodically replaced. Each such replacement is necessary to adjust the movement of teeth during treatment.

It would therefore be advantageous to provide a solution that would overcome the deficiencies of the prior art by correcting the arrangement of teeth in a patient while minimizing replacement of portions of the correcting device.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The disclosed embodiments include an orthodontic device for correcting an arrangement of teeth. The orthodontic device comprises: a plurality of brackets for attaching to teeth; a plurality of spring anchoring units, wherein each of the plurality of spring anchoring units is attached to one of the plurality of brackets; and a spring having a tension, two-dimensional longitudinal deformability and two-dimensional rotational deformability, wherein the spring is attached to each spring anchoring unit, wherein the tension is zero prior to attaching the plurality of brackets to the teeth, wherein further the tension is greater than zero immediately after attaching the plurality of brackets to the teeth, wherein further the tension is zero when the plurality of brackets is attached to the teeth and in an optimal position.

The disclosed embodiments also include a method for performing a corrective orthodontic procedure. The method comprises: forming a spring having a tension, two-dimensional longitudinal deformability, and two-dimensional rotational deformability based on the optimal positioning model; attaching the spring to a plurality of spring anchoring units; removing the spring anchoring units attached to the spring; attaching a plurality of new brackets to the teeth, wherein the plurality of new brackets is arranged based on the optimal positioning model; and attaching each spring anchoring unit to one of the plurality of new brackets, wherein the tension of the spring is zero prior to attaching the plurality of new brackets to the teeth, wherein further the tension is greater than zero immediately after attaching the plurality of new brackets to the teeth, wherein further the tension is zero when the plurality of new brackets are attached to the teeth and in the optimal position.

The disclosed embodiments also include a non-transitory computer readable medium having stored thereon instructions for creating an orthodontic device for correcting an arrangement of teeth. The non-transitory computer readable medium comprises: instructions for defining a plurality of brackets for attaching to teeth; instructions for defining a plurality of spring anchoring units, wherein each spring anchoring unit is structured to attach to one of the plurality of brackets; and instructions for defining a spring having a tension, two-dimensional longitudinal deformability and two-dimensional rotational deformability, wherein the spring is structured to attach to each spring anchoring unit, wherein the tension is zero prior to attaching the plurality of brackets to the teeth, wherein further the tension is greater than zero immediately after attaching the plurality of brackets to the teeth, wherein further the tension is zero when the plurality of brackets is attached to the teeth and in an optimal position.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
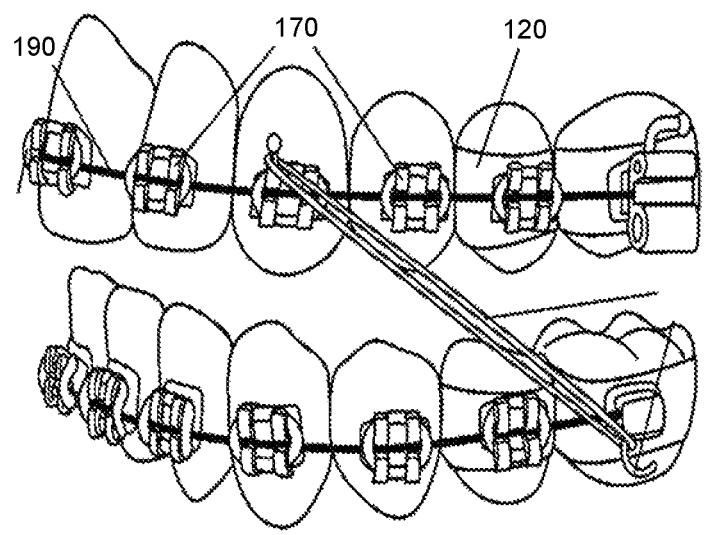
FIG. 1 is a schematic diagram of a conventional orthodontic device.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 2:
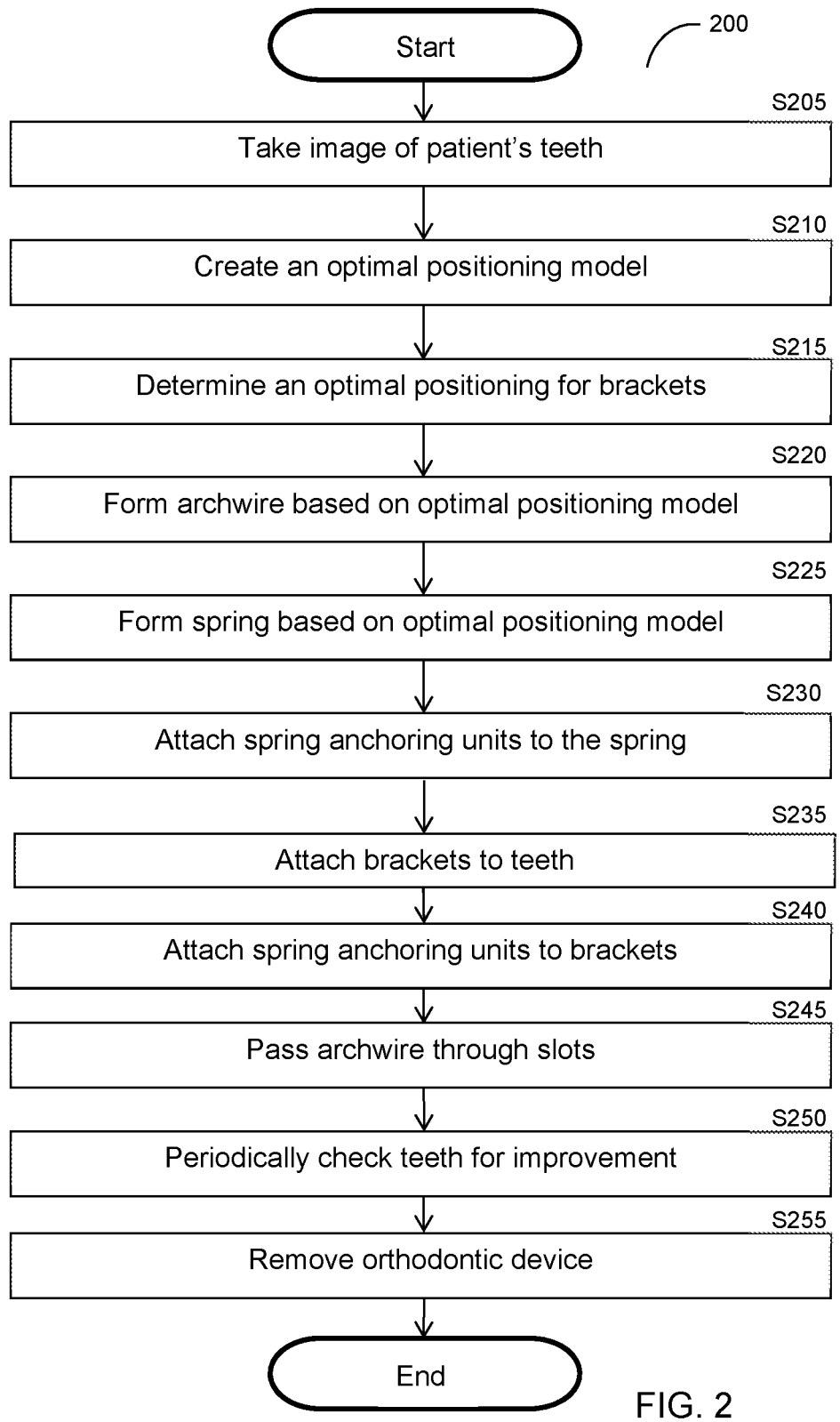
FIG. 2 is a flowchart illustrating a method for performing a corrective orthodontic procedure involving a spring and an archwire according to an embodiment.

FIG. 2 shows an exemplary and non-limiting flowchart illustrating a method for correcting an arrangement of teeth using an orthodontic device including brackets which may have slots, an archwire, a spring, and spring anchoring units which may have slots according to an embodiment. In an embodiment, the method may be performed lingually or buccaly. In an embodiment, the spring may be realized as a plurality of springs. It should be noted that, for purposes of the disclosed embodiments, the term "spring" may include any material that has a compressive, torque, and/or expansive property, and may or may not include optional bending characteristics. In an embodiment, the spring has two-dimensional longitudinal deformability and two-dimensional rotational deformability. In S205, an image of a patient's teeth is taken. The imaging may be performed using, e.g., x-ray, x-ray computed tomography, Panoramic x-ray, CAT, MRI, ultrasound, photograph, three-dimensional scanning, placing the teeth into a moldable material, and/or visual observation.

In S210, an optimal positioning model is created. The model may be, but is not limited to, a physical model, a computer model, a virtual model, and so on. In a further embodiment, the modeling may involve first creating a virtual or computer model and then creating a physical model. The optimal positioning model defines the optimal positions of teeth, which may be determined by, e.g., a medical professional, a technical expert, a patient, a computer program, an application, and so on. In an embodiment wherein the model is a physical model, the orthodontic device may initially be assembled on the model, wherein the spring and archwire are at rest.

In S215, based on the optimal positioning model, optimal positions for the brackets on the teeth are determined.

In S220, the archwire is formed based on the optimal positioning model. The archwire may be made of, but is not limited to, NiTi (Nickel Titanium), stainless steel, a polymer, a nanocomposite, a biological material, shape-memory alloy, and combinations thereof. In an embodiment, the archwire may be formed via an additive process such as, e.g., three-dimensional (3D) printing.

In S225, the spring is formed based on the optimal positioning model. The spring may be made of any material having elastic and/or compressive properties including, but not limited to, NiTi (Nickel Titanium), stainless steel, a polymer, a nanocomposite, a biological material, and combinations thereof. In an embodiment, the archwire and the spring may be preformed into optimal shapes via, e.g., heating, chemical formation, and/or mechanical formation. In another embodiment, the spring may be adapted to resist bending forces. In an embodiment, the spring may be formed via an additive process such as, e.g., three-dimensional (3D) printing.

In S230, the spring anchoring units are attached to the spring. Each spring anchoring unit may be attached to the spring at a predetermined position, which may be determined so as to move the teeth into their determined optimal positions. In an embodiment, the spring may be in a helical or coil shape. The spring may be in other shapes without departing from the disclosed embodiments. The spring anchoring units are attached to the spring so as to prevent slipping, moving, or changing orientation. In an embodiment, this attachment may be performed using, e.g., glue, epoxy, cement, dental adhesive, or other bonding materials. In another embodiment, other methods of attaching may be used, including but not limited to soldering, fastening, pinching, and welding. In another embodiment the spring anchoring units are printed on the predetermined position on the spring by three-dimensional (3D) printer In S235, the brackets are attached to the teeth. In an embodiment, attachment of the brackets to the teeth may be performed using, e.g., glue, epoxy, cement, dental adhesive, or other bonding materials. In S240, the spring anchoring units are attached to the brackets. In an embodiment, the attachment may be performed via, e.g., locking element, ligature, gluing, soldering, fastening, pinching, welding, or binding. In some embodiments, the spring anchoring units may be reversibly (i.e., not permanently) attached to the brackets so as to allow disconnection of the spring anchoring units. In some embodiments, each bracket and one or more respective spring anchoring units may be one component. In such embodiments, the spring anchoring units may be formed attached to the brackets without requiring any subsequent attachment.

In another embodiment, each bracket may further include a first joining element, and each spring anchoring unit may further include a second joining element. In such an embodiment, the first joining element of each bracket may be reversibly attached to a second joining element of a corresponding spring anchoring unit, thereby attaching the spring anchoring unit to the bracket. In a further embodiment, the first joining element may be a male joining element and the second joining element may be a female joining element, or vice versa.

In S245, the archwire is passed through the slots in the brackets or in the spring anchoring units. In an embodiment, the archwire is held in place by a ligature or locking element. In an embodiment, the archwire is held in place by the spring anchoring units. In another embodiment, the archwire may be realized as a plurality of archwires. In an embodiment, the archwire may be passed through the spring, in which case the slot for the archwire may be unnecessary. Passing the archwire through the spring is described further herein below with respect to FIG. 10. In another embodiment, the archwire may be passed through the slots such that the archwire may move freely within the slots.

In S250, the teeth are periodically checked for improvement in the arrangement. In S255, the orthodontic device is removed from the patient's teeth upon complete correction of the teeth arrangement.

As a result of stretching of the spring caused by attachment of the spring to the spring anchoring units when attaching it to the brackets on the teeth in the original position the spring becomes deformed. Such deformation stores potential energy that drives the spring anchoring units and brackets toward the optimal positions.

Figure 3:
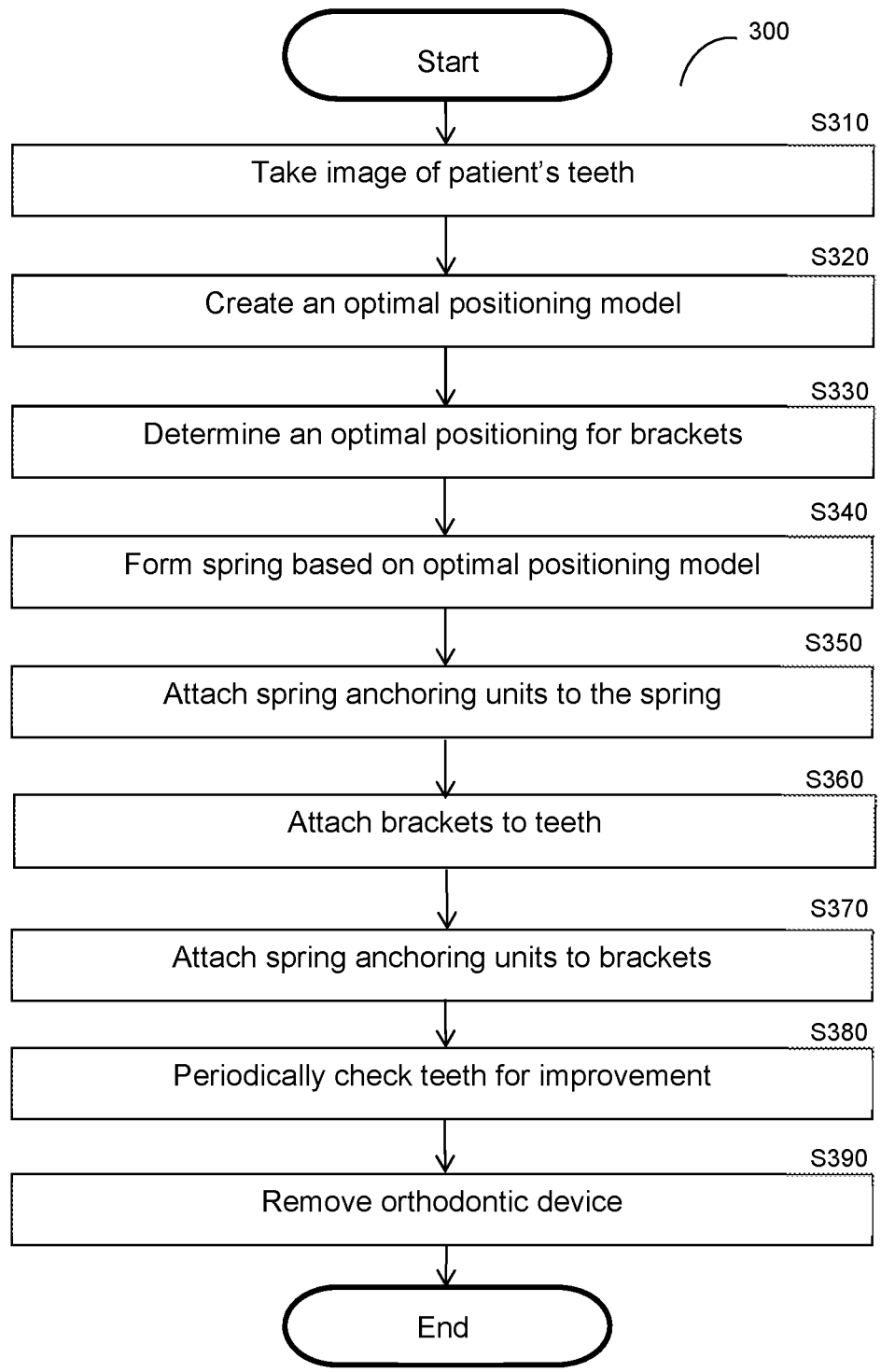
FIG. 3 is a flowchart illustrating a method for performing corrective orthodontic procedure involving a spring according to an embodiment.

FIG. 3 is an exemplary and non-limiting flowchart 500 illustrating a method for correcting an arrangement of teeth using an orthodontic device including brackets, a spring, and spring anchoring units according to an embodiment. In an embodiment, the spring has longitudinal and rotational deformability. In an embodiment, the method may be performed lingually or buccally. In an embodiment, the spring may be realized as a plurality of springs.

In S310, an image of a patient's teeth is taken. The imaging may be performed using, e.g., x-ray, x-ray computed tomography, Panoramic x-ray, CAT, MRI, ultrasound, photograph, three-dimensional scanning, placing the teeth into a moldable material, and/or visual observation.

In S320, an optimal positioning model is created. The optimal positioning model defines the correct arrangement of teeth, wherein the correct arrangement is determined by, e.g., an orthodontist and the patient. The model may be, but is not limited to, a physical model, a computer model, a virtual model, and so on. In a further embodiment, the modeling may involve first creating a virtual or computer model and then creating a physical model. The optimal positioning model defines the optimal positions of teeth, which may be determined by, e.g., a medical professional, a technical expert, a patient, a computer program, an application, and so on. In an embodiment wherein the model is a physical model, the orthodontic device may initially be assembled on the model, wherein the spring and archwire are at rest.

In S330, based on the optimal positioning model optimal, positions for the brackets on the teeth are determined.

In S340, the spring is formed based on the optimal positioning model. The spring may be made of any material having elastic and/or compressive properties including, but not limited to, NiTi (Nickel Titanium), stainless steel, a polymer, a nanocomposite, a biological material, and combinations thereof. In an embodiment, the spring may be preformed into an optimal shape via, e.g., heating, chemical formation, and/or mechanical formation. In another embodiment, the spring may be adapted to resist bending forces. In an embodiment, the spring may be formed via an additive process such as, e.g., three-dimensional (3D) printing.

In S350, the spring anchoring units are attached to the spring. Each spring anchoring unit may be attached to the spring at a predetermined position, which may be determined so as to move the teeth into their determined optimal positions. In an embodiment, the spring may be in a helical or coil shape. The spring may be in other shapes without departing from the disclosed embodiments. The spring anchoring units are attached to the spring so as to prevent slipping, moving, or changing orientation. In an embodiment, this attachment may be performed using, e.g., glue, epoxy, cement, dental adhesive, or other bonding materials. In another embodiment, other methods of attaching may be used, including but not limited to soldering, fastening, pinching, and welding. In another embodiment the spring anchoring units are printed on the predetermined position by three-dimensional (3D) printer In S360, the brackets are attached to the teeth. In an embodiment, attachment of the brackets to the teeth may be performed using, e.g., glue, epoxy, cement, dental adhesive, or other bonding materials.

In S370, the spring anchoring units are further attached to the brackets. In an embodiment, the attachment may be performed via, e.g., locking element, ligature, gluing, soldering, fastening, pinching, welding, or binding. In some embodiments, the spring anchoring units may be reversibly (i.e., not permanently) attached to the brackets so as to allow disconnection of the spring anchoring units. In some embodiments, each bracket and one or more respective spring anchoring units may be one component. In such embodiments, the spring anchoring units may be formed attached to the brackets without requiring any subsequent attachment.

In S380, the teeth are periodically checked for improvement in the arrangement. In S390, the orthodontic device is removed from the patient's teeth upon complete correction of the teeth arrangement.

As a result of stretching of the spring caused by attachment of the spring to the spring anchoring units when attaching it to the brackets on the teeth in the original position the spring becomes deformed. Such deformation stores potential energy that drives the spring anchoring units and brackets toward the optimal positions.

Figure 4A:
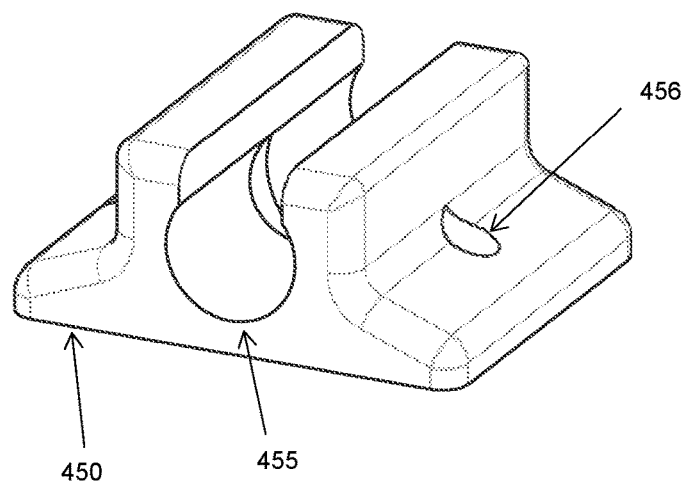
FIGS. 4A-E are schematic diagrams illustrating various components used to describe the disclosed embodiments.

FIGS. 4A-E are exemplary and non-limiting schematic diagrams illustrating a spring anchoring unit 450 according to some embodiments. As shown in FIG. 4A, the spring anchoring unit 450 includes a spring traversal region 455 as well as coupling regions 456 adapted to be attached to brackets already on teeth (brackets and teeth not shown). The spring anchoring unit 450 serves the production process of the custom-made system and to drive the orthodontic alteration process. A spring is placed in the spring traversal region 455 and locked in place on the spring anchoring unit 450. In an embodiment, the spring has longitudinal and rotational deformability. The position of the spring anchoring unit 450 relative to an at-rest spring (not shown in FIG. 4A) is determined by images of the teeth in need of repair and a proposed optimal positioning model of the teeth. The spring anchoring units 450 are placed and tightly fastened to a spring so as to allow potential energy stored in the spring to drive the realignment of the teeth in the mouth.

Figure 4B:
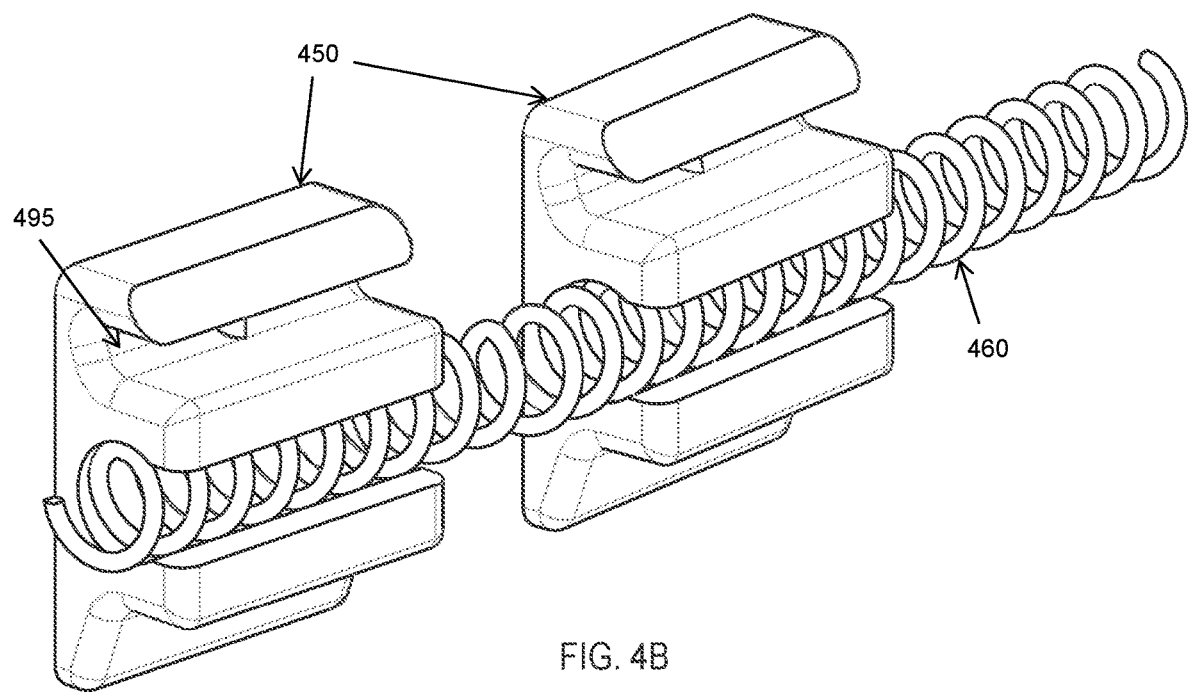

When the spring anchoring unit 450 is attached to an associated spring, there is no tension in the spring. The attachment is generally done away from the patient and his/her mouth. In various embodiments, the spring anchoring units may be attached to the spring via, e.g., welding, gluing, soldering, fastening, pinching, or printed using a 3D printer onto the spring. FIG. 4B shows a pair of spring anchoring units 450, wherein each spring anchoring unit is fastened to a spring 460. In an embodiment, the spring 460 may be made of, but is not limited to, NiTi (Nickel Titanium), stainless steel, a polymer, a nanocomposite, a biological material, and combinations thereof. The fastening may be accomplished reversibly or permanently. It should be noted that, in the embodiment shown in FIG. 4B, the spring anchoring unit 450 includes an optional archwire traversal region 495 adapted to accept an archwire in the event that the archwire is run outside of the spring 460.

Figure 4C:
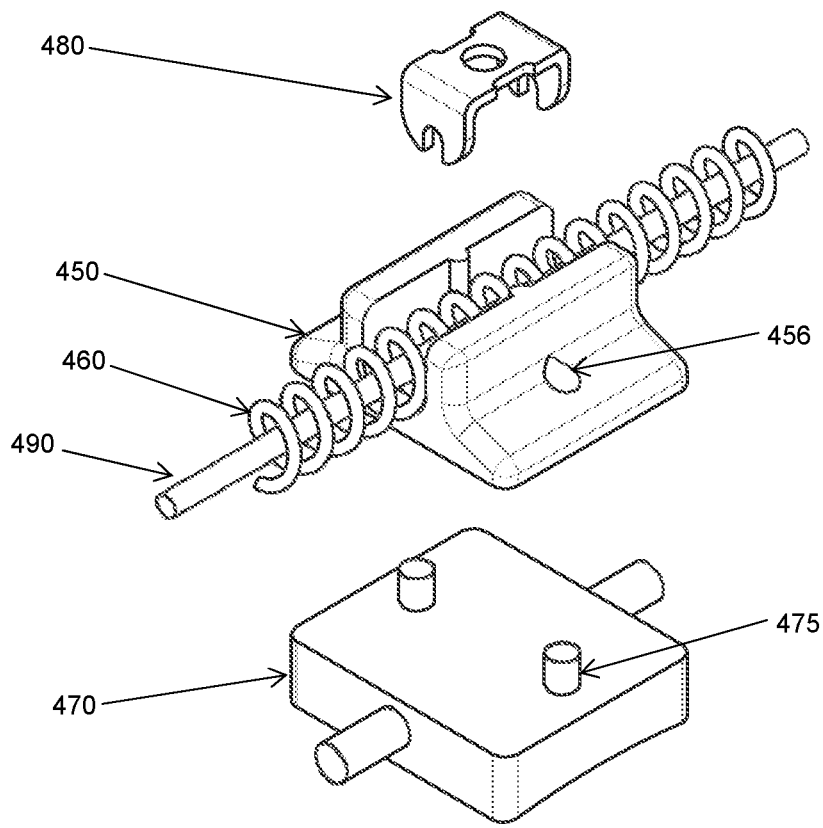

FIG. 4C shows an exploded view of the spring anchoring unit 450 with its associated portion of the spring 460 positioned over an orthodontic bracket 470 adapted to receive the spring anchoring unit 450 with spring 460. In an embodiment, the orthodontic bracket 470 may possess one or more engaging elements 475. In another embodiment, the orthodontic bracket 470 may be made of a material such as, but not limited to, stainless steel, ceramic, polymer, or metal. In an embodiment, the orthodontic bracket 470 may be produced by a 3D printer.

In some embodiments, an optional cap 480 may be placed over the spring 460 to hold the spring 460 in place within the spring anchoring unit. The cap 480 is generally present during attachment between the spring 460 and the spring anchoring unit 450, and may be removed thereafter. The orthodontic bracket 470 is located on a tooth, and the spring anchoring unit 450 is joined up to the orthodontic bracket 470. The orthodontic bracket 470 includes an engaging element 675 adapted to interact with the coupling region 456 of the spring anchoring unit 450 to hold the spring anchoring unit 450 in place. In the embodiment shown in FIG. 4C, the archwire 490 is disposed within the spring 460 such that the archwire 690 may move freely within the spring 460. It should be noted that, in various embodiments, the archwire does not need to be disposed within the spring.

Figure 4D:
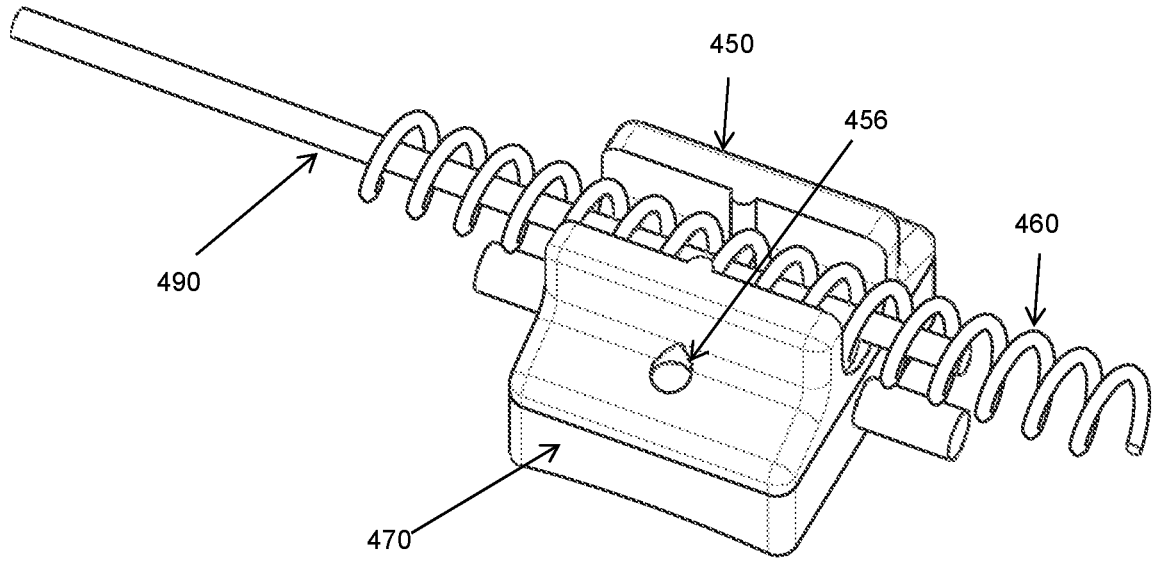

FIG. 4D shows the orthodontic bracket 470 joined with the spring anchoring unit 450 and associated spring 460. Note that the engaging element 675 is placed in and securely attached to the coupling region 456. An archwire 490 is disposed within the spring 460. The archwire 490 may be disposed directly within the spring 460, or another material (not shown) may be placed between the archwire 490 and the spring 460 to allow for more facile movement of the archwire 490 relative to the spring 460. In an embodiment, the archwire 490 may be made of, but is not limited to, NiTi (Nickel Titanium), stainless steel, a polymer, a nanocomposite, a biological material, and combinations thereof.

Figure 4E:
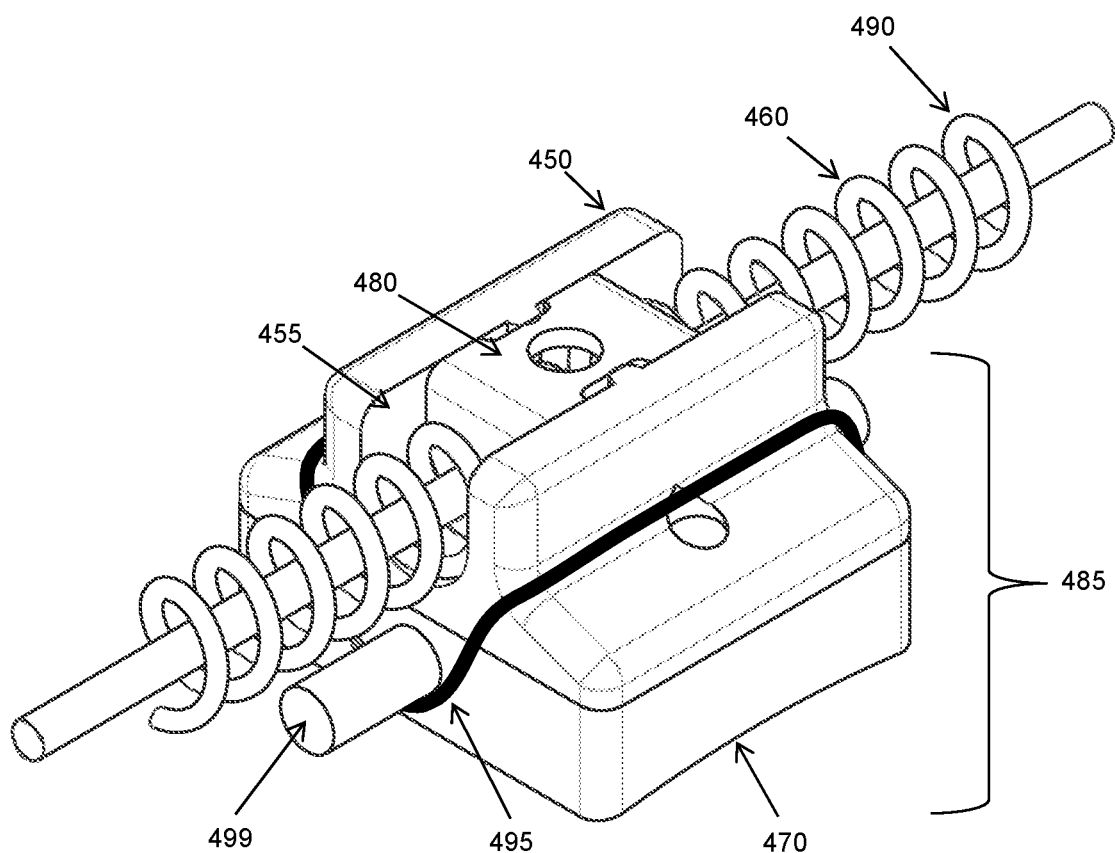

FIG. 4E shows an assembled holo-bracket 485 which is comprised of an orthodontic bracket 470 joined with a spring anchoring unit 450 and an associated spring 460. The holo-bracket 485 includes a locking system 495 to further aid in the orthodontic procedure. In an embodiment, the locking system may be a wire. The locking system 495 is held in place by arms 499. It should be noted that the archwire 490 is disposed within the spring 660 located in the spring traversal region 455, with the optional cap 480 holding the spring 460 in place.

Figure 5:
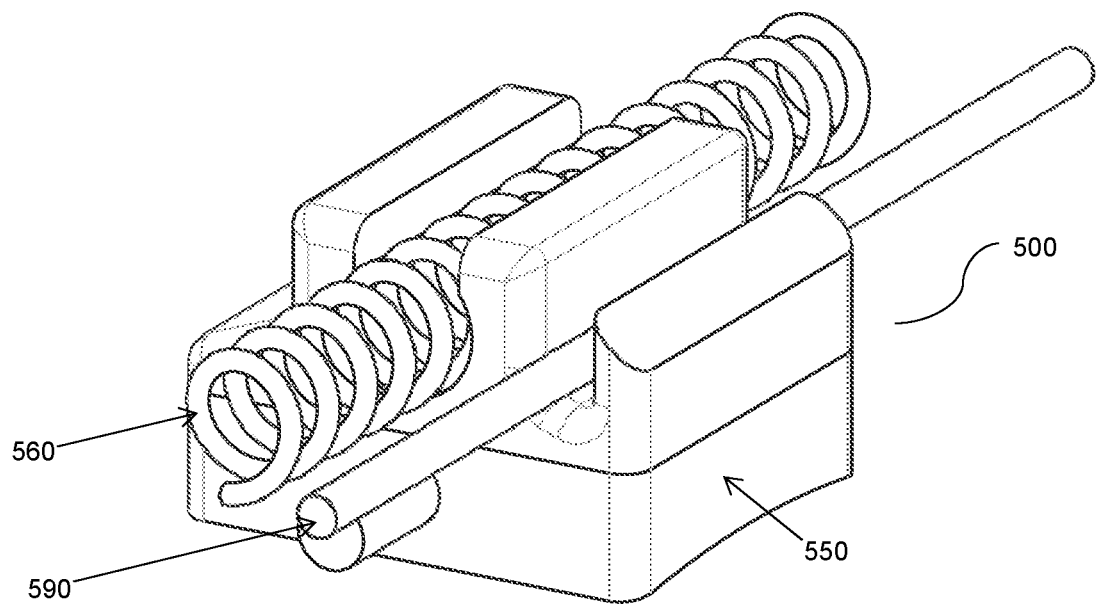
FIG. 5 is a schematic diagram illustrating an orthodontic device according to an embodiment.

FIG. 5 is a schematic diagram illustrating an orthodontic device 500 including an archwire 590 and a spring 560 acting independently to move teeth according to an embodiment. The archwire 590 is disposed outside of the spring 560 but is associated with a spring anchoring unit 550. Thus, while the archwire 590 and spring 560 work to straighten teeth (teeth not shown), they act independently of one another.

Figure 6:
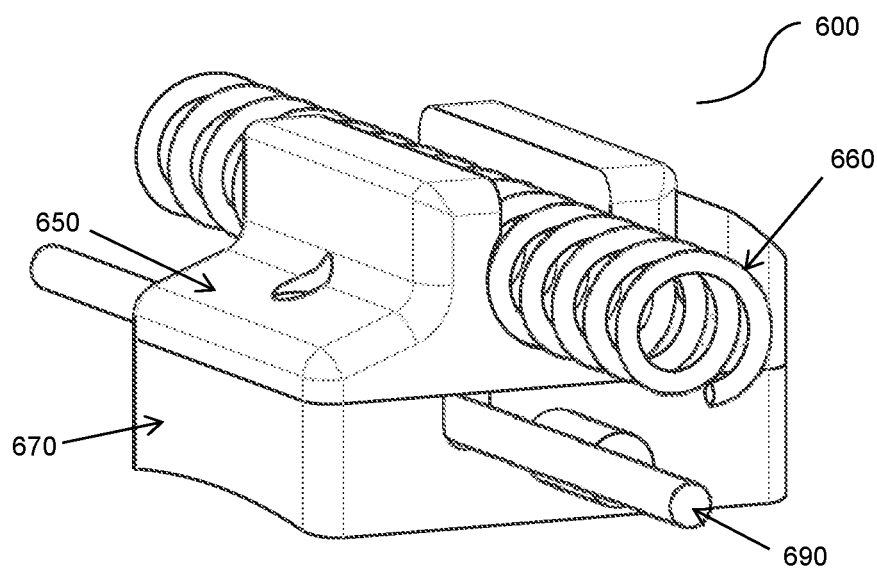
FIG. 6 is a schematic diagram illustrating an orthodontic device according to an embodiment.

FIG. 6 is a schematic diagram illustrating an orthodontic device 600 including an archwire 690 and a spring 660 acting independently to move teeth according to an embodiment. In this embodiment, the archwire 690 is associated with an orthodontic bracket 670 and is separate from the spring 660 and from a spring anchoring unit 650.

Figure 7A:
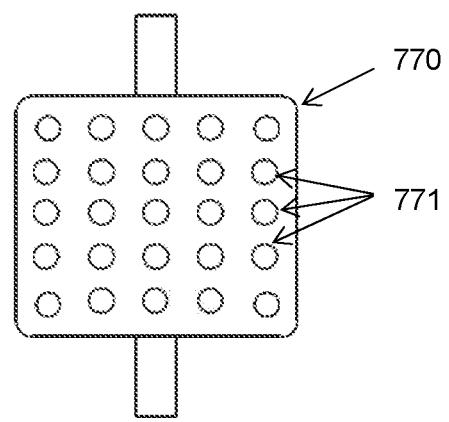
FIGS. 7A-C are schematic diagrams illustrating an orthodontic bracket utilized according to an embodiment.
Figure 7B:
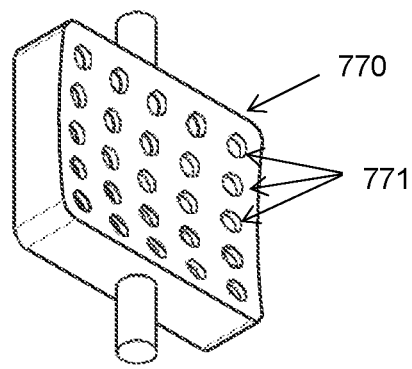
Figure 7C:
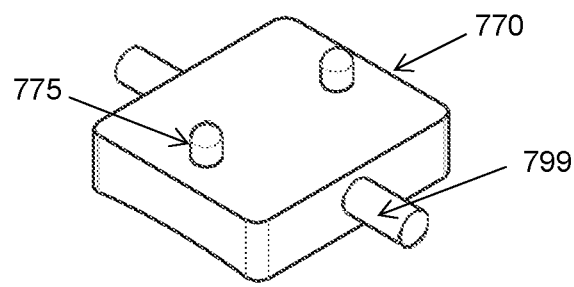

FIGS. 7A-C are two-dimensional illustrations of an orthodontic bracket 770 according to an embodiment. FIG. 7A shows the orthodontic bracket 770 including holes 771 to aid in facile attachment to teeth. In another embodiment, any coarse surface may be used to aid in facile attachment to the teeth. The holes may aid in attachment to the teeth by, e.g., providing a resting place for an adhesive before the bracket is attached to the teeth. FIG. 7B shows an embodiment in which the orthodontic bracket 770 has a curved shape. FIG. 7C shows the orthodontic bracket 770 with engaging elements 775 to aid in attachment to a spring anchoring unit (not shown). Dedicated arms 799 are present for holding elastic bands or the like (not shown).

Figure 8:
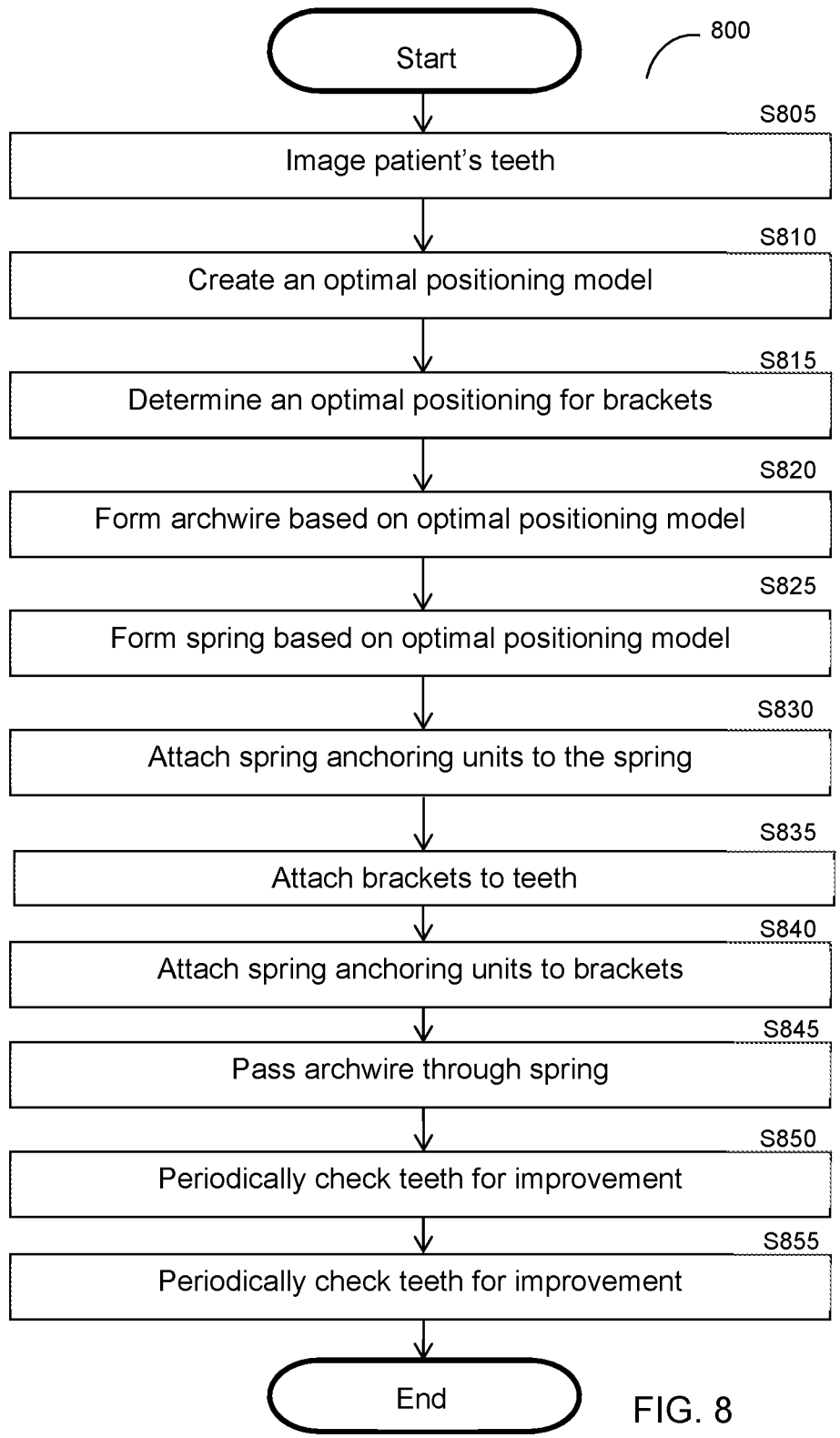
FIG. 8 is a flowchart illustrating a method for performing a corrective orthodontic procedure according to an embodiment.

FIG. 8 shows an exemplary and non-limiting flowchart illustrating a method for correcting an arrangement of teeth using an orthodontic device including brackets, an archwire, a spring, and spring anchoring units according to an embodiment. In an embodiment, the spring has longitudinal and rotational deformability. In an embodiment, the method may be performed lingually or buccaly. In an embodiment, the spring may be realized as a plurality of springs.

In S805, an image of a patient's teeth is taken. The imaging may be performed using, e.g., x-ray, x-ray computed tomography, Panoramic x-ray, CAT, MRI, ultrasound, photograph, three-dimensional scanning, placing the teeth into a moldable material, and/or visual observation.

In S810, an optimal positioning model is created. The model may be, but is not limited to, a physical model, a computer model, a virtual model, and so on. In a further embodiment, the modeling may involve first creating a virtual or computer model and then creating a physical model. The optimal positioning model defines the optimal positions of teeth, which may be determined by, e.g., a medical professional, a technical expert, a patient, a computer program, an application, and so on. In an embodiment wherein the model is a physical model, the orthodontic device may initially be assembled on the model, wherein the spring and archwire are at rest.

In S815, based on the optimal positioning model, optimal positions for the brackets on the teeth are determined.

In S820, the archwire is formed based on the optimal positioning model. The archwire may be made of, but is not limited to, NiTi (Nickel Titanium), stainless steel, a polymer, a nanocomposite, a biological material, shape-memory alloy, and combinations thereof. In an embodiment, the archwire may be formed via an additive process such as, e.g., three-dimensional (3D) printing.

In S825, the spring is formed based on the optimal positioning model. The spring may be made of any material having elastic and/or compressive properties including, but not limited to, NiTi (Nickel Titanium), stainless steel, a polymer, a nanocomposite, a biological material, and combinations thereof. In an embodiment, the archwire and the spring may be preformed into optimal shapes via, e.g., heating, chemical formation, and/or mechanical formation. In another embodiment, the spring may be adapted to resist bending forces. In an embodiment, the spring may be formed via an additive process such as, e.g., three-dimensional (3D) printing.

In S830, the spring anchoring units are attached to the spring. Each spring anchoring unit may be attached to the spring at a predetermined position, which may be determined so as to move the teeth into their determined optimal positions. In an embodiment, the spring may be in a helical or coil shape. The spring may be in other shapes without departing from the disclosed embodiments. The spring anchoring units are attached to the spring so as to prevent slipping, moving, or changing orientation. In an embodiment, this attachment may be performed using, e.g., glue, epoxy, cement, dental adhesive, or other bonding materials. In another embodiment, other methods of attaching may be used, including but not limited to soldering, fastening, pinching, and welding. In another embodiment the spring anchoring units are printed on the predetermined position by three-dimensional (3D) printer. In an embodiment, each spring anchoring unit may include support holding elements for adding supports such as, but not limited to, springs, elastic bands, or wire.

In S835, the brackets are attached to the teeth. In an embodiment, attachment of the brackets to the teeth may be performed using, e.g., glue, epoxy, cement, dental adhesive, or other bonding materials.

In S840, the spring anchoring units are attached to the brackets. In an embodiment, the attachment may be performed via, e.g., locking element, ligature, gluing, soldering, fastening, pinching, welding, or binding. In some embodiments, the spring anchoring units may be reversibly (i.e., not permanently) attached to the brackets so as to allow disconnection of the spring anchoring units. In some embodiments, each bracket and one or more respective spring anchoring units may be one component. In such embodiments, the spring anchoring units may be formed attached to the brackets without requiring any subsequent attachment.

In another embodiment, each bracket may further include a first joining element, and each spring anchoring unit may further include a second joining element. In such an embodiment, the first joining element of each bracket may be reversibly attached to a second joining element of a corresponding spring anchoring unit, thereby attaching the spring anchoring unit to the bracket. In a further embodiment, the first joining element may be a male joining element and the second joining element may be a female joining element, or vice versa.

In yet another embodiment, each bracket may include a first side for attaching to a tooth and a second side for attaching to a spring anchoring unit. In an embodiment, the second side may have a slot for an archwire. In another embodiment, the second side may have an engaging element that may be reversibly attachable to the spring anchoring unit. In another embodiment, each bracket may include support holding elements for adding supports such as, but not limited to, springs, elastic bands, or wire.

In S845, the archwire is passed through the spring. In another embodiment, the archwire may be realized as a plurality of archwires.

In S850, the teeth are periodically checked for improvement in the arrangement. In an embodiment where the second side has an engaging element that is reversibly attachable to the spring anchoring unit, S1050 may further include, in case of damage in the spring, removing spring anchoring units with the spring from the brackets and replacing the damaged unit with new spring anchoring units with a spring. In an embodiment, S850 may further include, in case of the orthodontist decision, removing spring anchoring units with the spring from the brackets and replacing it with a units which have a slot for archwire with no spring.

In S855, the orthodontic device is removed from the patient's teeth upon complete correction of the teeth arrangement.

As a result of stretching of the spring caused by attachment of the spring to the spring anchoring units when attaching it to the brackets on the teeth in the original position the spring becomes deformed. Such deformation stores potential energy that drives the spring anchoring units and brackets toward the optimal positions.

Figure 9:
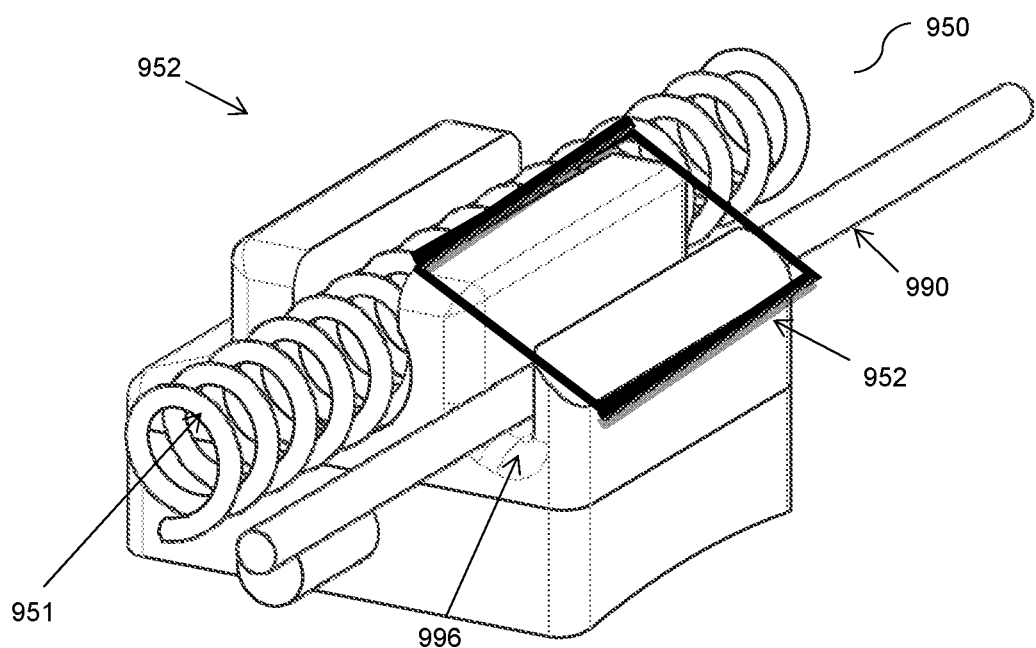
FIG. 9 is a schematic diagram illustrating a spring anchoring unit including an elastic tie element according to an embodiment.

FIG. 9 is an exemplary and non-limiting schematic diagram illustrating a spring anchoring unit 950 including an elastic tie element 951 according to an embodiment. The elastic tie element 951 is attached to elastic tie element holders 952. The elastic tie element 951 can aid in an orthodontic procedure by, e.g., holding an archwire 990 in place. In the embodiment shown in FIG. 9, the elastic tie element 951 is placed over the archwire 990 that rests within an archwire traversal region 996. In an embodiment, the elastic tie element 951 can be replaced by a mechanical locking element.

Figure 10:
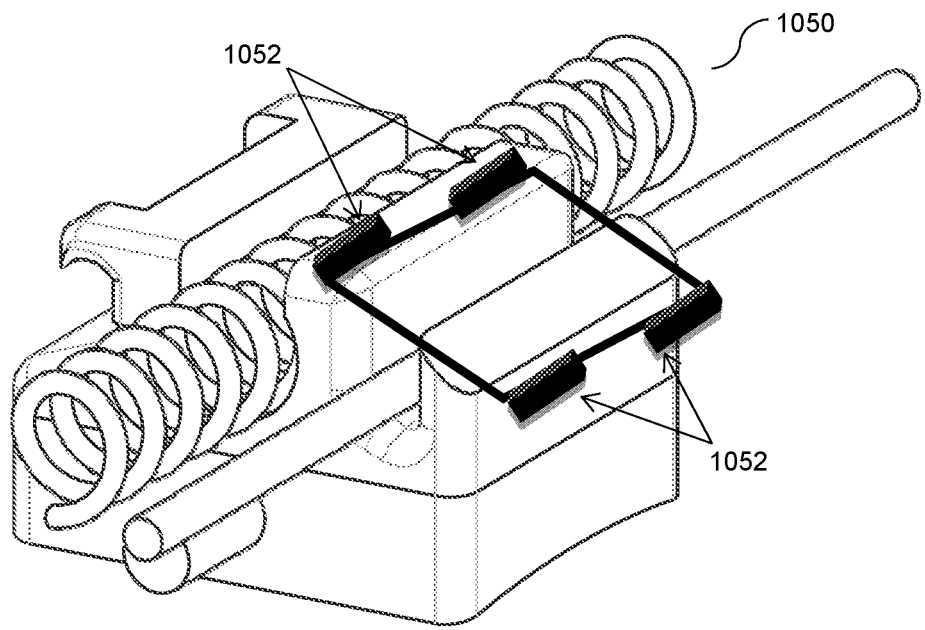
FIG. 10 is a schematic diagram illustrating a spring anchoring unit including an alternative elastic tie element according to an embodiment.

FIG. 10 is an exemplary and non-limiting schematic diagram illustrating a spring anchoring unit 1050 including alternative elastic tie elements 1052 according to an embodiment.

Figure 11:
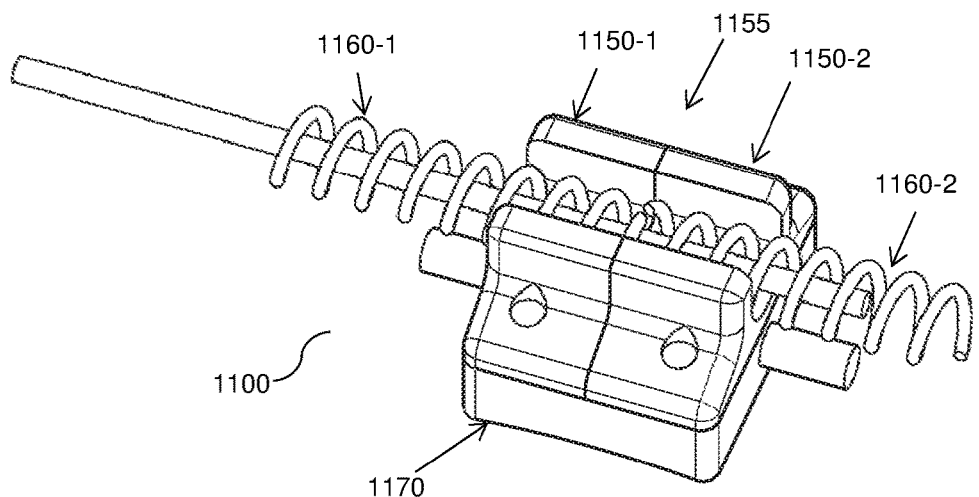
FIG. 11 is a schematic diagram illustrating an orthodontic device including a bracket attached to two spring anchoring units according to an embodiment.
Figure 12:
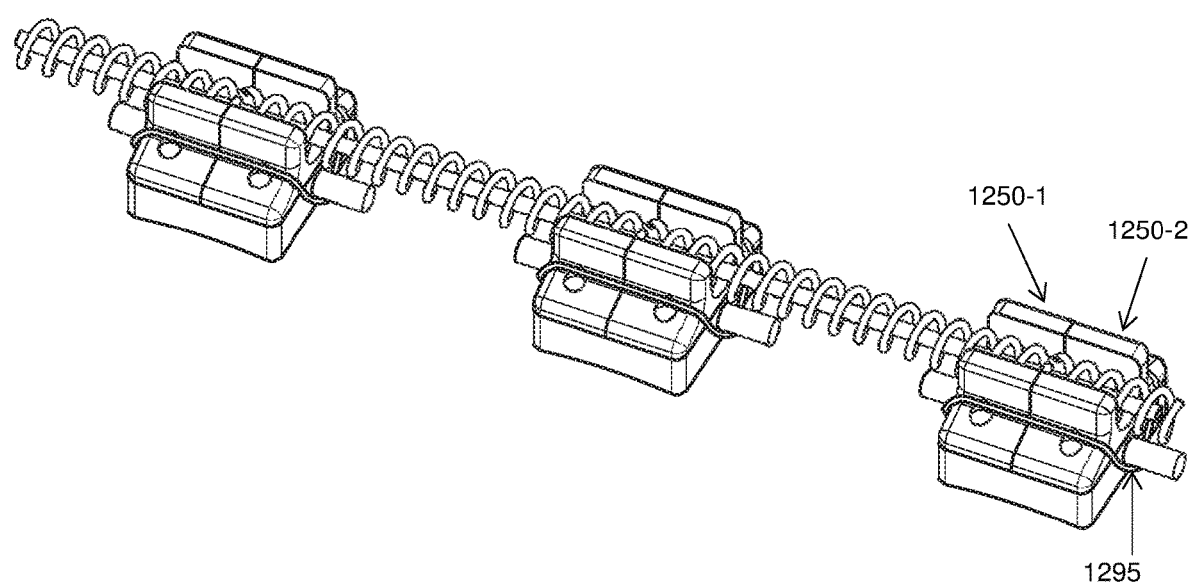
FIG. 12 is a schematic diagram illustrating an orthodontic device including a bracket attached to two spring anchoring units according to an embodiment.

FIG. 11 is a schematic diagram illustrating an orthodontic device 1100 according to an embodiment. A bracket 1170 has two separate spring anchoring units 1150-1 and 1150-2 attached to it. A line 1155 demonstrates where the spring anchoring units 1150-1 and 1150-2 and associated springs 1160-1 and 1160-2 are separated. In some embodiments, it would be possible to use a plurality of springs 1160, wherein each spring is run between two or more teeth. In a further embodiment, different springs with different resistances (forces) may be used in different areas of the teeth One spring anchoring unit 1150-1 holds a spring 1160-1 connected to a tooth to the left while an adjacent spring anchoring unit 1350-2 holds a spring 1160-2 connected to a tooth to the right. Such an arrangement is shown schematically in FIG. 12. A locking system or steel wire 1295 may be included to hold adjacent spring anchoring units 1250-1 and 1250-2 together.

It should be noted that, in various embodiments, the entire model of the device and its associated components may be heated to release pressure and to finalize the form of the components. The heating may be performed prior to or after attaching the components. In particular, if gluing or another heat-sensitive attaching is used to attach the components, heating will typically be performed prior to attaching.

The following non-limiting example is utilized to aid in demonstrating the various disclosed embodiments. A patient visits his orthodontist, who makes a physical model of the patient's teeth. This model is used to create a virtual and then a physical model of optimal final positions of patient's teeth after an orthodontic procedure. On this model, brackets are attached to the appropriate teeth in appropriate positions on the teeth. Spring anchoring units are attached to all brackets. A spring at resting condition is placed and secured to the spring anchoring units. An archwire may be placed in slots on the brackets or through the spring itself. The entire model and associated components may be heated to release pressure and to finalize the form of the components (a temperature of about 500 degrees Celsius is typically suitable for NiTi). The components are removed from the model. New brackets are glued to the teeth of the patient. The spring anchoring units with spring and optional archwire are attached to the brackets once the brackets are secured to the patient's teeth, thereby actuating stress on the optional archwire and on the spring. The spring and optional archwire drive orthodontic improvement of teeth condition. It is understood that a physical model is not required and all manipulations prior to installment may be done virtually. It is also understood that an archwire may not be required for some treatments.

The components of various disclosed embodiments may optionally be produced via additive processes such as, but not limited to, three-dimensional (3D) printing, robotic manufacturing, and so on. Accordingly, an embodiment may include, but is not limited to, a non-transitory computer readable medium having stored thereon instructions for defining components of an orthodontic device having a plurality of brackets, a plurality of spring anchoring units, and a spring. The components of such a device may be produced so as to be attachable to each other. A non-transitory computer readable medium may be, but is not limited to, read-only memory, random access memory, magnetic storage, flash storage, optical storage media, and so on.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An orthodontic device for correcting an arrangement of teeth, comprising:
    a plurality of brackets for attaching to teeth, wherein the plurality of brackets defines a plurality of slots;
    a plurality of spring anchoring units, wherein each of the plurality of spring anchoring units is attached to one of the plurality of brackets;
    a spring having a tension, two-dimensional longitudinal deformability and two-dimensional rotational deformability, wherein the spring is attached to each spring anchoring unit, wherein the tension is zero prior to attaching the plurality of brackets to the teeth, wherein further the tension is greater than zero immediately after attaching the plurality of brackets to the teeth, wherein further the spring is formed based on an optimal positioning model such that the tension is zero when the plurality of brackets is attached to the teeth and in an optimal final position, wherein the optimal final position is defined by the optimal positioning model; and
    an archwire, wherein the archwire moves freely within the slots defined in the plurality of brackets, wherein the archwire is formed based on the optimal positioning model.

2. The orthodontic device of claim 1, wherein the orthodontic device is configured to be applied lingually or buccaly.

3. The orthodontic device of claim 1, wherein the spring and the archwire are prepared from Nickel Titanium, stainless steel, polymers, nanocomposites, or biological materials.

4. The orthodontic device of claim 1, wherein the spring and the archwire are preformed by any one of: heating means, chemical means, and mechanical means.

5. The orthodontic device of claim 1, wherein the plurality of brackets and the plurality of spring anchoring units are made of stainless steel, ceramic, a polymer, or a metal.

6. The orthodontic device of claim 1, wherein each spring anchoring unit is attached to the spring using at least one of: welding, gluing, soldering, fastening, pinching, and chemical bonding.

7. The orthodontic device of claim 1, wherein the plurality of spring anchoring units are printed on the spring by means of a three-dimensional printer.

8. The orthodontic device of claim 1, wherein the plurality of brackets includes a first joining element and the plurality of spring anchoring units includes a second joining element for reversibly attaching the plurality of spring anchoring units to the plurality of brackets.

9. The orthodontic device of claim 1, wherein each spring anchoring unit is formed attached to one of the plurality of brackets.

10. The orthodontic device of claim 1, wherein at least two of the plurality of spring anchoring units are attached to each bracket.

11. The orthodontic device of claim 1, wherein the plurality of brackets and the plurality of spring anchoring units include any one of: anchors for addition springs, elastic bands, and wires.

12. The orthodontic device of claim 1, wherein the plurality of spring anchoring units are reversibly attached to the brackets by any one of: a locking element, a ligature, gluing, soldering, fastening, pinching, welding, and binding.

13. A method for performing a corrective orthodontic procedure using an optimal positioning model defining an optimal position of teeth, comprising:
- forming a spring having a tension, two-dimensional longitudinal deformability, and two-dimensional rotational deformability based on the optimal positioning model;
- forming an archwire based on the optimal positioning model;
- attaching the spring to a plurality of spring anchoring units;
- attaching a plurality of new brackets to the teeth, wherein the plurality of new brackets is arranged based on the optimal positioning model, wherein the plurality of new brackets defines a plurality of slots;
- attaching each spring anchoring unit to one of the plurality of new brackets, wherein the tension of the spring is zero prior to attaching the plurality of new brackets to the teeth, wherein further the tension is greater than zero immediately after attaching the plurality of new brackets to the teeth, wherein further the tension is zero when the plurality of new brackets are attached to the teeth and in the optimal position; and
- disposing the archewire in the plurality of slots, wherein the archwire moves freely within the slots defined in the plurality of brackets, wherein the archwire is formed based on the optimal positioning model.

14. The method of claim 13, wherein attaching the spring to a plurality of spring anchoring units further comprises:
- attaching a plurality of brackets to the optimal positioning model of teeth;
- attaching the plurality of spring anchoring units to the plurality of brackets; and
- attaching the spring to the plurality of spring anchoring units such that the tension is equal to zero.

15. The method of claim 14 wherein the optimal positioning model is a virtual model and the plurality of spring anchoring units are attached to a corresponding position on the spring.

16. The method of claim 13, wherein the plurality of brackets and the plurality of spring anchoring units include any one of: anchors for addition springs, elastic bands, and wires.

17. The method of claim 13, wherein the method is performed lingually or buccaly.

18. The method of claim 13, wherein the spring and the archwire are formed from any of: Nickel Titanium, stainless steel, a polymer, a nanocomposite, and a biological material.

19. The method of claim 13, wherein the spring and the archwire are preformed into optimal shapes by any one of: heating means, chemical means, and mechanical means.

20. The method of claim 13, wherein the plurality of brackets and the plurality of spring anchoring units are made of stainless steel, ceramic, a polymer, or a metal.

21. The method of claim 13, wherein the attaching of the plurality of spring anchoring units to the spring is performed by at least one of: welding, gluing, soldering, fastening, pinching, chemical bonding, and printing on the spring by a three-dimensional printer.

22. The method of claim 13, wherein the plurality of brackets includes a first joining element and the plurality of spring anchoring units includes a second joining element for reversibly attaching the plurality of spring anchoring units to the plurality of brackets.

23. The method of claim 13, wherein the plurality of spring anchoring units are reversibly attached to the brackets by a locking element, a ligature, gluing, soldering, fastening, pinching, welding, or binding.

24. The method of claim 13, wherein each of the plurality of spring anchoring units is formed attached to one of the plurality of brackets.

25. The method of claim 13, wherein at least two of the plurality of spring anchoring units are attached to each bracket.

* * * * *